United States Patent
Kish et al.

(10) Patent No.: US 8,150,470 B2
(45) Date of Patent: *Apr. 3, 2012

(54) SYSTEM AND METHOD FOR TRANSMISSION PARAMETER CONTROL FOR AN ANTENNA APPARATUS WITH SELECTABLE ELEMENTS

(75) Inventors: William S. Kish, Saratoga, CA (US); John Chanak, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,250

(22) Filed: Feb. 28, 2011

(65) Prior Publication Data

US 2011/0151931 A1   Jun. 23, 2011

Related U.S. Application Data

(62) Division of application No. 11/180,329, filed on Jul. 12, 2005, now Pat. No. 7,899,497.

(60) Provisional application No. 60/602,711, filed on Aug. 18, 2004, provisional application No. 60/603,157, filed on Aug. 18, 2004, provisional application No. 60/625,331, filed on Nov. 5, 2004.

(51) Int. Cl.
*H04M 1/00*   (2006.01)

(52) U.S. Cl. .................. 455/562.1; 455/561; 455/226.1; 455/277.2; 455/278.1; 455/130; 343/876; 343/893; 343/846; 343/795; 343/793

(58) Field of Classification Search .............. 455/562.1, 455/561, 226.1, 277.2, 278.1, 130; 343/876, 343/893, 846, 795, 793
See application file for complete search history.

(56) References Cited

U.S. PATENT DOCUMENTS

| | | | |
|---|---|---|---|
| 4,027,307 A | 5/1977 | Litchford | |
| 5,453,752 A | 9/1995 | Wang et al. | |
| 6,005,525 A | 12/1999 | Kivela | |
| 6,169,888 B1 * | 1/2001 | Lindenmeier et al. | 455/277.2 |
| 6,249,216 B1 | 6/2001 | Flick | |
| 6,288,682 B1 | 9/2001 | Thiel et al. | |
| 6,445,688 B1 | 9/2002 | Garces et al. | |
| 6,492,957 B2 | 12/2002 | Carillo, Jr. et al. | |
| 6,606,059 B1 | 8/2003 | Barabash | |
| 6,888,504 B2 | 5/2005 | Chiang et al. | |
| 7,064,717 B2 | 6/2006 | Kaluzni et al. | |
| 7,164,380 B2 | 1/2007 | Saito | |
| 7,206,610 B2 | 4/2007 | Iacono et al. | |
| 7,333,460 B2 | 2/2008 | Vaisanen et al. | |
| 7,609,648 B2 | 10/2009 | Hoffmann et al. | |
| 7,649,831 B2 | 1/2010 | Van Rensburg et al. | |

(Continued)

*Primary Examiner* — Ajit Patel
*Assistant Examiner* — Khai M Nguyen
(74) *Attorney, Agent, or Firm* — Lewis and Roca LLP

(57) ABSTRACT

A system and method for improved data transmission on a wireless link to a remote receiving node includes a communication device for converting packets to RF at a physical data rate, an antenna apparatus having a plurality of antenna configurations for transmitting the RF, and a processor for selecting the antenna configuration and the physical data rate based on whether the remote receiving node indicated reception of the data transmission. The processor may determine a table of success ratios for each antenna configuration and may rank each antenna configuration by the success ratio. The processor may transmit with an unused antenna configuration to probe the unused antenna configuration and update the table of success ratios. Similarly, the processor may maintain a table of effective user data rates, rank each physical data rate by the effective user data rate and probe unused physical data rates to update the table.

5 Claims, 8 Drawing Sheets

U.S. PATENT DOCUMENTS

| | | |
|---|---|---|
| 7,782,895 B2 | 8/2010 | Pasanen et al. |
| 7,835,697 B2 | 11/2010 | Wright |
| 2002/0119757 A1 | 8/2002 | Hamabe |
| 2002/0142744 A1* | 10/2002 | Okanoue et al. ........... 455/226.1 |
| 2003/0038698 A1 | 2/2003 | Hirayama |
| 2004/0008614 A1* | 1/2004 | Matsuoka et al. ............ 370/203 |
| 2005/0128988 A1 | 6/2005 | Simpson et al. |
| 2007/0010271 A1 | 1/2007 | Roy |
| 2007/0191068 A1* | 8/2007 | Ochi et al. ................. 455/562.1 |
| 2008/0212582 A1* | 9/2008 | Zwart et al. ................... 370/390 |
| 2009/0080333 A1 | 3/2009 | Ozer et al. |
| 2009/0154359 A1 | 6/2009 | Strutt et al. |

\* cited by examiner

| Antenna Configuration 510 | Attempted Transmissions 520 | Successful Transmissions 530 | Success Ratio 540 | RSSI 550 |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

800

| Physical Data Rate 810 | Effective User Data Rate 820 |
|---|---|
| 54 Mbps | |
| 48 Mbps | |
| 36 Mbps | |
| 24 Mbps | |
| 18 Mbps | |
| 12 Mbps | |
| 11 Mbps | |
| 9 Mbps | |
| 6 Mbps | |
| 5.5 Mbps | |
| 2 Mbps | |
| 1 Mbps | |

FIG. 8

SYSTEM AND METHOD FOR TRANSMISSION PARAMETER CONTROL FOR AN ANTENNA APPARATUS WITH SELECTABLE ELEMENTS

CROSS-REFERENCE TO RELATED APPLICATIONS

This application is a divisional and claims the priority benefit of patent application Ser. No. 11/180,329 filed Jul. 12, 2005 now U.S. Pat. No. 7,899,497 and entitled "System and Method for Transmission Parameter Control for an Antenna Apparatus with Selectable Elements," which claims the priority benefit of U.S. provisional application No. 60/602,711 filed Aug. 18, 2004 and entitled "Planar Antenna Apparatus for Isotropic Coverage and QoS Optimization in Wireless Networks," U.S. provisional application No. 60/603,157 filed on Aug. 18, 2004 and entitled "Software for Controlling a Planar Antenna Apparatus for Isotropic Coverage and QoS Optimization in Wireless Networks," and U.S. provisional application No. 60/625,331 filed on Nov. 5, 2004 and entitled "Systems and Methods for Improved Data Throughput in Wireless Local Area Networks." The disclosure of each of the aforementioned applications is incorporated herein by reference. This application is related to U.S. patent application Ser. No. 11/010,076 filed on Dec. 9, 2004, now U.S. Pat. No. 7,292,198 which issued on Nov. 6, 2007, and entitled "System and Method for an Omnidirectional Planar Antenna Apparatus with Selectable Elements," U.S. patent application Ser. No. 11/022,080 filed on Dec. 23, 2004, now U.S. Pat. No. 7,193,562 which issued on Mar. 20, 2007, and entitled "Circuit Board Having a Peripheral Antenna Apparatus with Selectable Antenna Elements," and U.S. patent application Ser. No. 11/041,145 filed on Jan. 21, 2005, now U.S. Pat. No. 7,362,280 which issued on Apr. 22, 2008, and entitled "System and Method for a Minimized Antenna Apparatus with Selectable Elements." The disclosure of each of the aforementioned applications is incorporated herein by reference.

BACKGROUND OF THE INVENTION

1. Technical Field

The present invention relates generally to wireless communication networks, and more particularly to a system and method for transmission parameter control for an antenna apparatus with selectable elements.

2. Description of Related Art

In communications systems, there is an ever-increasing demand for higher data throughput and a corresponding drive to reduce interference that can disrupt data communications. For example, in an IEEE 802.11 network, an access point (i.e., a base station) communicates data with one or more remote receiving nodes over a wireless link. The wireless link may be susceptible to interference from other access points, other radio transmitting devices, or disturbances in the environment of the wireless link between the access point and the remote receiving node, among others. The interference may be to such a degree as to degrade the wireless link, for example, by forcing communication at a lower data rate. The interference also may be sufficiently strong enough to completely disrupt the wireless link.

One method for reducing interference in the wireless link between the access point and the remote receiving node is to provide several omnidirectional antennas for the access point, in a "diversity" scheme. For example, a common configuration for the access point comprises a data source coupled via a switching network to two or more physically separated omnidirectional antennas. The access point may select one of the omnidirectional antennas by which to maintain the wireless link. Because of the separation between the omnidirectional antennas, each antenna experiences a different signal environment, and each antenna contributes a different interference level to the wireless link. The switching network couples the data source to whichever of the omnidirectional antennas experiences the least interference in the wireless link.

Current methods that provide switching among antenna configurations, such as diversity antennas, and previous methods of controlling antenna segments, are unable to effectively minimize the interference from other access points, other radio transmitting devices, or disturbances in the environment of the wireless link between the access point and the remote receiving node. Typically, methods for antenna configuration selection are of the trial-and-error approach. In a trial-and-error approach, a transmission is made on each antenna configuration to determine which antenna configuration provides a more effective wireless link (e.g., as measured by a packet error ratio). The trial-and-error approach is inefficient, as it generally requires transmission on a "bad" antenna configuration to determine the poor quality of that antenna configuration. Further, the trial-and-error approach becomes increasingly inefficient with a large number of antenna configurations.

Additionally, current methods may require measurements of parameters such as voltage standing wave ratio, signal quality, or bit error rate for each antenna configuration. Such measurements can take a significant amount of time to compute, and may require large numbers of data packets to be transmitted before the measurements can be performed.

SUMMARY OF THE INVENTION

The present invention is directed to systems and methods for transmission parameter control. A system comprises an antenna apparatus, a communication device, and a processor. The antenna apparatus includes a plurality of antenna configurations where each antenna configuration corresponds to a radiation pattern. The communication device converts data to a radio frequency signal at one of a plurality of physical data rates. The processor is configured to execute a program to perform a method of selecting a current antenna configuration of the antenna apparatus, selecting a current physical data rate of the communication device, transmitting a packet with the current antenna configuration to a remote receiving node at the current physical data rate, determining whether the remote receiving node received the packet, and changing the current antenna configuration based on the determination.

The system may determine a success ratio for each of the plurality of antenna configurations by comparing a number of packets transmitted to the remote receiving node and a number of packets indicated as received by the remote receiving node. In some embodiments, the system ranks each of the plurality of antenna configurations by the success ratio. The system may change the current antenna configuration by selecting one of the plurality of antenna configurations having a higher success ratio than the current antenna configuration. The system may further determine a link quality metric, such as received signal strength indicator (RSSI) for each of the plurality of antenna configurations.

In some embodiments, the system selects an unused antenna configuration, transmits a probe packet with the unused antenna configuration to the remote receiving node, determines whether the remote receiving node received the probe packet, and changes the ranking of the unused antenna configuration based on the determination whether the remote receiving node received the probe packet. Similarly, the system may probe unused physical data rates. The system determines an effective user data rate for each of the plurality of physical data rates based on a number of packets transmitted to the remote receiving node, a number of packets indicated as received by the remote receiving node, and the physical data rate. The system may rank each physical data rate by the effective user data rate.

Rather than maintaining transmission parameter control data for each of a plurality of antenna configurations and each of a plurality of physical data rates, an alternative method includes mapping each of the plurality of antenna configurations to a logical antenna, mapping each of the physical data rates to a logical data rate, transmitting a packet to the remote receiving node with the first logical antenna at the first logical data rate, determining whether the remote receiving node received the packet, and changing the first logical antenna based on the determination. The method further computes a first link quality metric for the first logical data rate, selects a second logical antenna, transmits a probe packet to the remote receiving node with the second logical antenna, determines a second link quality metric based on a determination whether the remote receiving node received the probe packet, and changes the first logical antenna to the second logical antenna based on the second link quality metric. Similarly, the method may compute a first effective user data rate for the first logical data rate, select a second logical data rate, transmit a probe packet to the remote receiving node at the second logical data rate, determine a second effective user data rate based on a determination whether the remote receiving node received the probe packet, and change the first logical data rate to the second logical antenna based on the second effective user data rate.

BRIEF DESCRIPTION OF THE DRAWINGS

The present invention will now be described with reference to drawings that represent embodiments of the invention. In the drawings, like components have the same reference numerals. The illustrated embodiments are intended to illustrate, but not to limit the invention. The drawings include the following figures:

FIG. 8 illustrates an exemplary table of effective user data rates for multiple physical data rates, in one embodiment in accordance with the present invention.

DETAILED DESCRIPTION

A system for a wireless (i.e., radio frequency or RF) link to a remote receiving device includes a communication device for generating an RF signal, an antenna apparatus with selectable antenna elements for transmitting and/or receiving the RF signal, and a processor for controlling the communication device and the antenna apparatus. The communication device converts data packets into RF at one of a plurality of selectable physical data rates. Each antenna element of the antenna apparatus provides gain (with respect to isotropic) and a directional radiation pattern, and may be electrically selected (e.g., switched on or off) so that the antenna apparatus may form a configurable (i.e., direction agile) radiation pattern. The processor selects the antenna configuration so that interference may be minimized in the wireless link to the remote receiving node. The processor also selects the physical data rate to maximize data transmission speed.

For example, due to interference from other radio transmitting devices, or disturbances in the wireless link between the system and the remote receiving device, the processor may select an antenna configuration with a resulting radiation pattern that minimizes the interference. The processor may select an antenna configuration corresponding to a maximum gain between the system and the remote receiving device. Alternatively, the processor may select an antenna configuration corresponding to less than maximal gain, but corresponding to reduced interference in the wireless link. Similarly, the processor may select a physical data rate that maximizes data transmission speed, referred to herein as an effective user data rate, over the wireless link to the remote receiving device.

Figure 1:
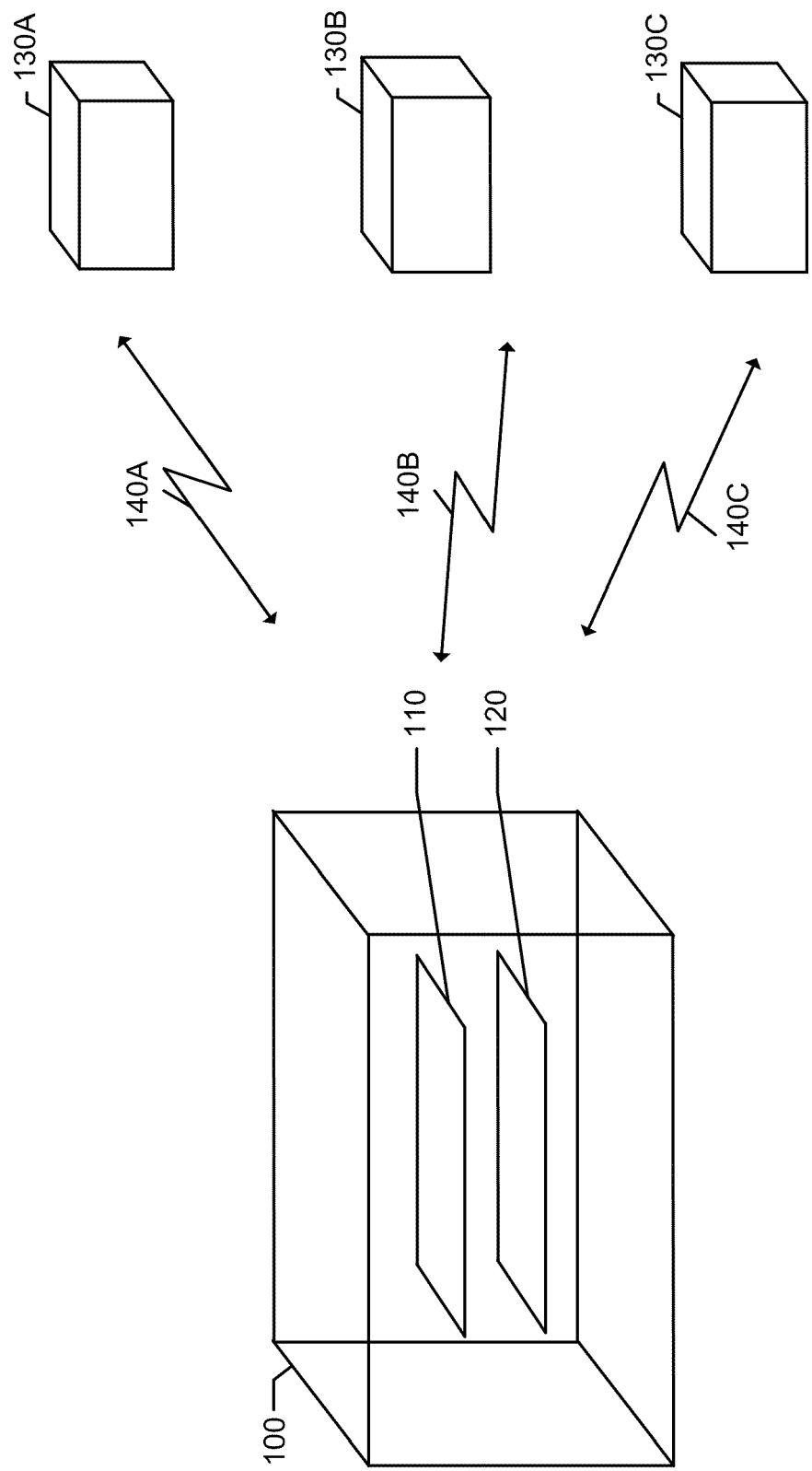
FIG. 1 illustrates a system comprising an antenna apparatus with selectable elements, in one embodiment in accordance with the present invention.

FIG. 1 illustrates a system 100 comprising an antenna apparatus with selectable elements, in one embodiment in accordance with the present invention. The system 100 may comprise, for example without limitation, a transmitter and/or a receiver, such as an 802.11 access point, an 802.11 receiver, a set-top box, a laptop computer, a television, a PCMCIA card, a remote control, and a remote terminal such as a handheld gaming device. In some exemplary embodiments, the system 100 comprises an access point for communicating with one or more remote receiving nodes over a wireless link, for example, in an 802.11 wireless network. Typically, the system 100 may receive data from a router connected to the Internet (not shown), and the system 100 may transmit the data to one or more remote receiving nodes (e.g., receiving nodes 130A-130C). The system 100 may also form a part of a wireless local area network (LAN) by enabling communications among two or more of the remote receiving nodes 130A-130C. Although this disclosure will focus on a specific embodiment for the system 100, aspects of the invention are applicable to a wide variety of appliances, and are not intended to be limited to the disclosed embodiment. For example, although the system 100 will be described as the access point for an 802.11 wireless network, the system 100 may also comprise the remote receiving node 130A.

The system 100 includes a communication device 120 (e.g., a transceiver) and an antenna apparatus 110. The communication device 120 comprises virtually any device for converting data at a physical data rate and for generating and/or receiving a corresponding RF signal. The communication device 120 may include, for example, a radio modulator/demodulator for converting data received by the system 100 (e.g., from a router) into the RF signal for transmission to one or more of the remote receiving nodes 130A-130C. In some embodiments, for example, the communication device 120 comprises circuitry for receiving data packets of video from the router and circuitry for converting the data packets into 802.11 compliant RF signals.

The antenna apparatus 110 includes a plurality of individually selectable antenna elements (not shown). When selected, each of the antenna elements produces a directional radiation pattern with gain (as compared to an omnidirectional antenna). As described further, the antenna apparatus 110 includes an antenna element selector device 310 to selectively couple one or more of the antenna elements to the communication device 120. Various embodiments of the antenna apparatus 110 and the antenna element selector device 310 are further described in co-pending U.S. patent application Ser. No. 11/010,076 entitled "System and Method for an Omnidirectional Planar Antenna Apparatus with Selectable Elements," filed on Dec. 9, 2004, U.S. patent application Ser. No. 11/022,080 entitled "Circuit Board Having a Peripheral Antenna Apparatus with Selectable Antenna Elements," filed on Dec. 23, 2004, and U.S. patent application Ser. No. 11/041,145 entitled "System and Method for a Minimized Antenna Apparatus with Selectable Elements," filed on Jan. 21, 2005.

Figure 2:
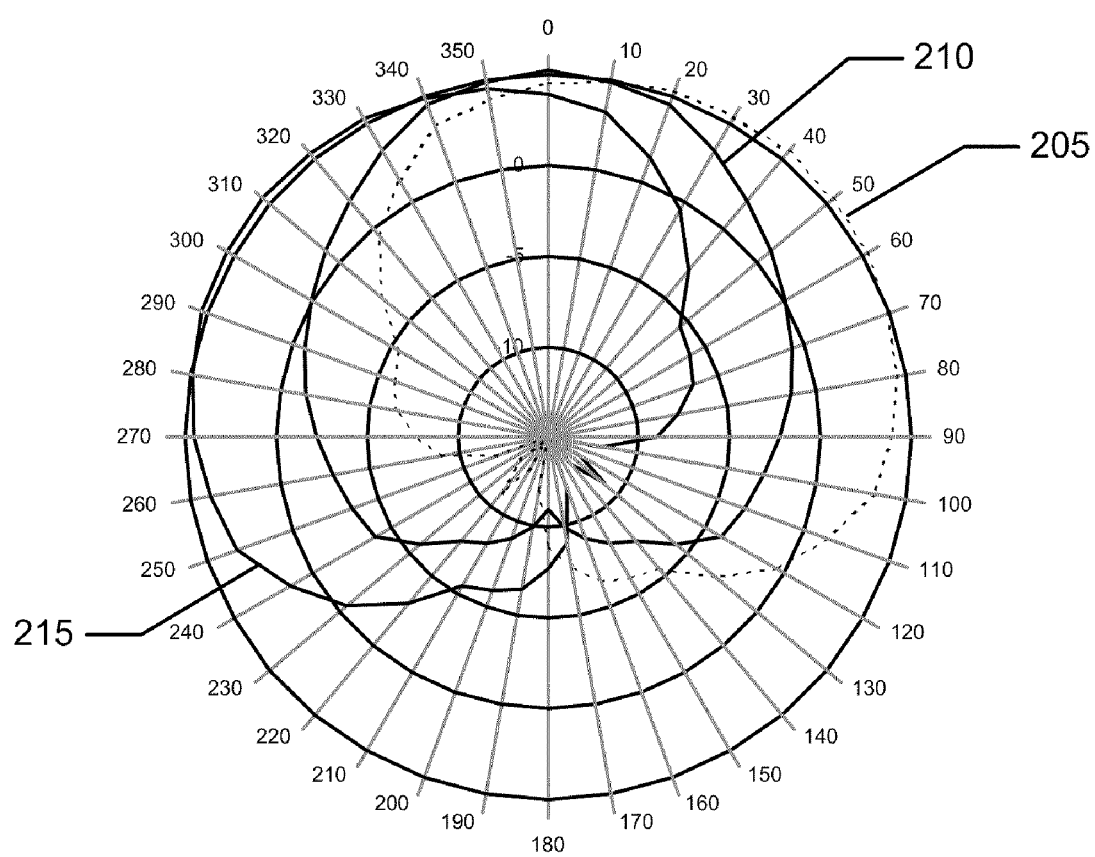
FIG. 2 illustrates various radiation patterns resulting from selecting different antenna configurations of the antenna apparatus of FIG. 1, in one embodiment in accordance with the present invention.

FIG. 2 illustrates various radiation patterns resulting from selecting different antenna elements of the antenna apparatus 110 of FIG. 1, in one embodiment in accordance with the present invention. The antenna apparatus 110 used to produce the radiation pattern of FIG. 2 comprises four selectable antenna elements {A|B|C|D}. The antenna elements (referred to as antenna elements A-D) are offset from each other by 90 degrees. Each antenna element produces a similar radiation pattern offset from the other radiation patterns (e.g., the radiation pattern of the antenna element A is offset by 90 degrees from the radiation pattern of the antenna element B). Accordingly, selecting one or more of the antenna elements A-D produces 15 different radiation patterns. Only three of the radiation patterns are shown in FIG. 2, for clarity of explanation.

A first radiation pattern 215 is produced by selecting the antenna element A. The radiation pattern is a generally cardioid pattern oriented with a center at about 315 degrees in azimuth. A second radiation pattern 205, depicted as a dotted line, is produced by selecting the antenna element B. The antenna element B is offset 90 degrees from antenna element A. The radiation pattern 205 is therefore oriented with a center at about 45 degrees in azimuth. A combined radiation pattern 210, depicted as a bold line, results from selecting the antenna element A and the antenna element B. It will be appreciated that by selecting one or more of the antenna elements A-D, fifteen radiation patterns can be produced by the antenna apparatus 110.

Not shown, for clarity, is a substantially omnidirectional radiation pattern that may be produced by selecting two or more of the antenna elements A-D. Therefore, it will be appreciated that the antenna apparatus 110 may produce a range of radiation patterns, ranging from highly directional to omnidirectional. Accordingly, the resulting radiation patterns are also referred as antenna configurations.

Figure 3:
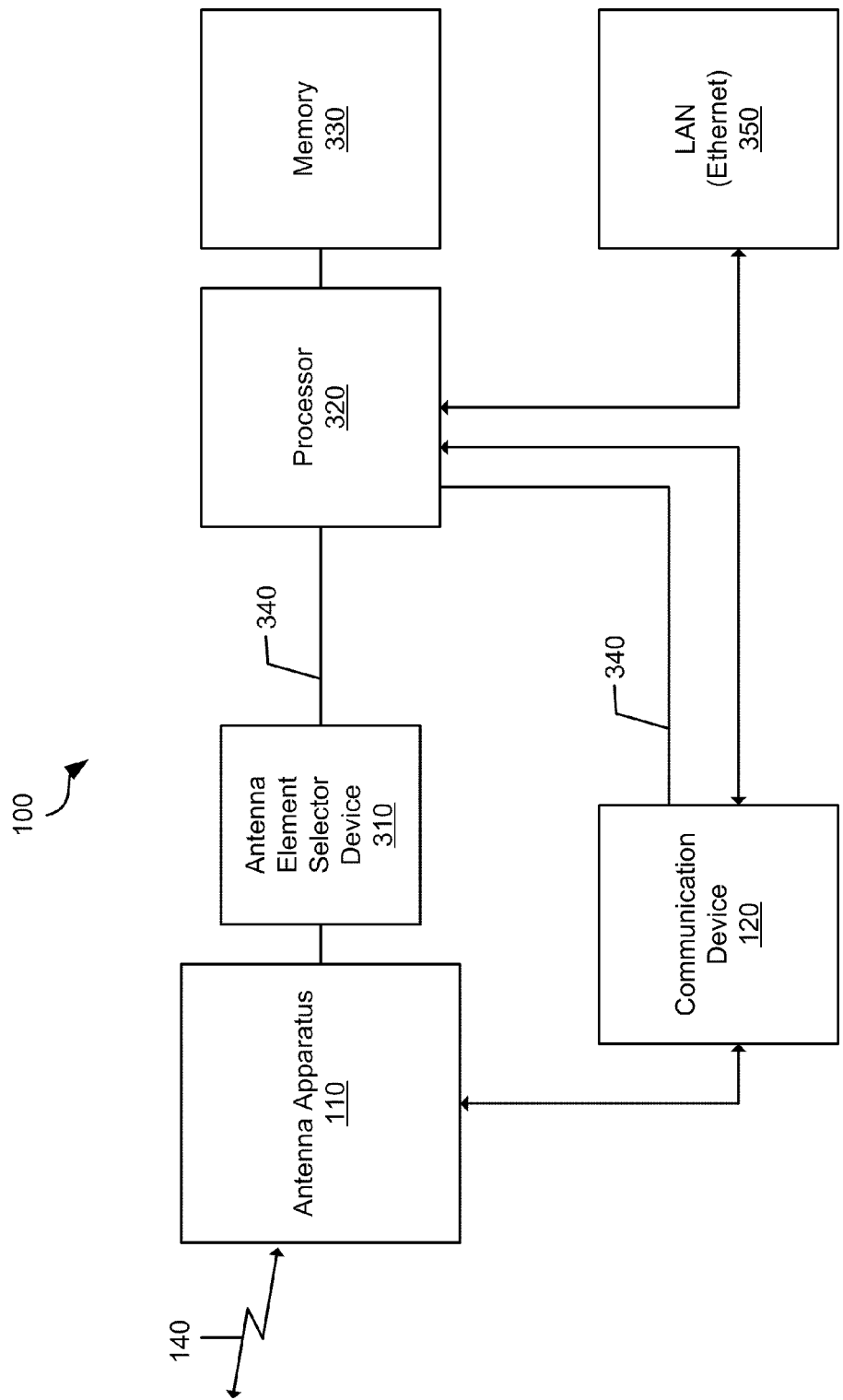
FIG. 3 illustrates an exemplary block diagram of the system of FIG. 1, in one embodiment in accordance with the present invention.

FIG. 3 illustrates an exemplary block diagram of the system 100, in one embodiment in accordance with the present invention. The system 100 includes a processor 320 coupled to a memory 330. In some embodiments, the processor 320 may comprise a microcontroller, a microprocessor, or an application-specific integrated circuit (ASIC). The processor 320 executes a program stored in the memory 330. The memory 330 also stores transmission control data, which may be retrieved by the processor 320 to control selection of the antenna configuration of the antenna apparatus 110 and selection of the physical data rate of the communication device 120.

The processor 320 is coupled to the antenna element selector device 310 by a control bus 340. The antenna element selector device 310 is coupled to the antenna apparatus 110 to allow selection from among the multiple radiation patterns described in FIG. 2. The processor 320 controls the antenna element selector device 310 to select an antenna configuration (i.e., one of the multiple radiation patterns) of the antenna apparatus 110.

The processor 320 is further coupled to the communication device 120 by the control bus 340. The processor 320 controls the communication device 120 to select a physical data rate (i.e., one of the multiple physical data rates). The processor 320 controls the physical data rate at which the communication device 120 converts data bits into RF signals for transmission via the antenna apparatus 110.

In some embodiments, the processor 320 may receive packet data, Transmission Control Protocol (TCP) packet data, or User Datagram Protocol (UDP) packet data from an external local area network (LAN) 350. The processor 320 converts the TCP or UDP packet data into an 802.11 wireless protocol. The processor 320 selects an antenna configuration of the antenna apparatus 110 and sends the 802.11 wireless protocol to the communication device 120 for conversion at the physical data rate into RF for transmission via the antenna apparatus 110 to the remote receiving node (e.g., the remote receiving node 130A) over the wireless link (e.g., the wireless link 140A).

Generally, a method executed by the processor 320 for selecting the antenna configuration comprises creating a table having transmission parameter control data for each remote receiving node 130. The table includes link quality metrics for each antenna configuration. Some examples of link quality metrics are a success ratio, an effective user data rate, a received signal strength indicator (RSSI), and error vector magnitude (EVM).

In one embodiment, the success ratio is defined as a number of data packets indicates as received by the particular remote receiving node 130 divided by a number of data packets transmitted to the remote receiving node 130. The success ratio may be dependent on the physical data rate used to transmit on the antenna configuration. Advantageously, the table may be sorted by the success ratio, for example, so that highly successful antenna configurations may be preferably selected.

Figure 4:
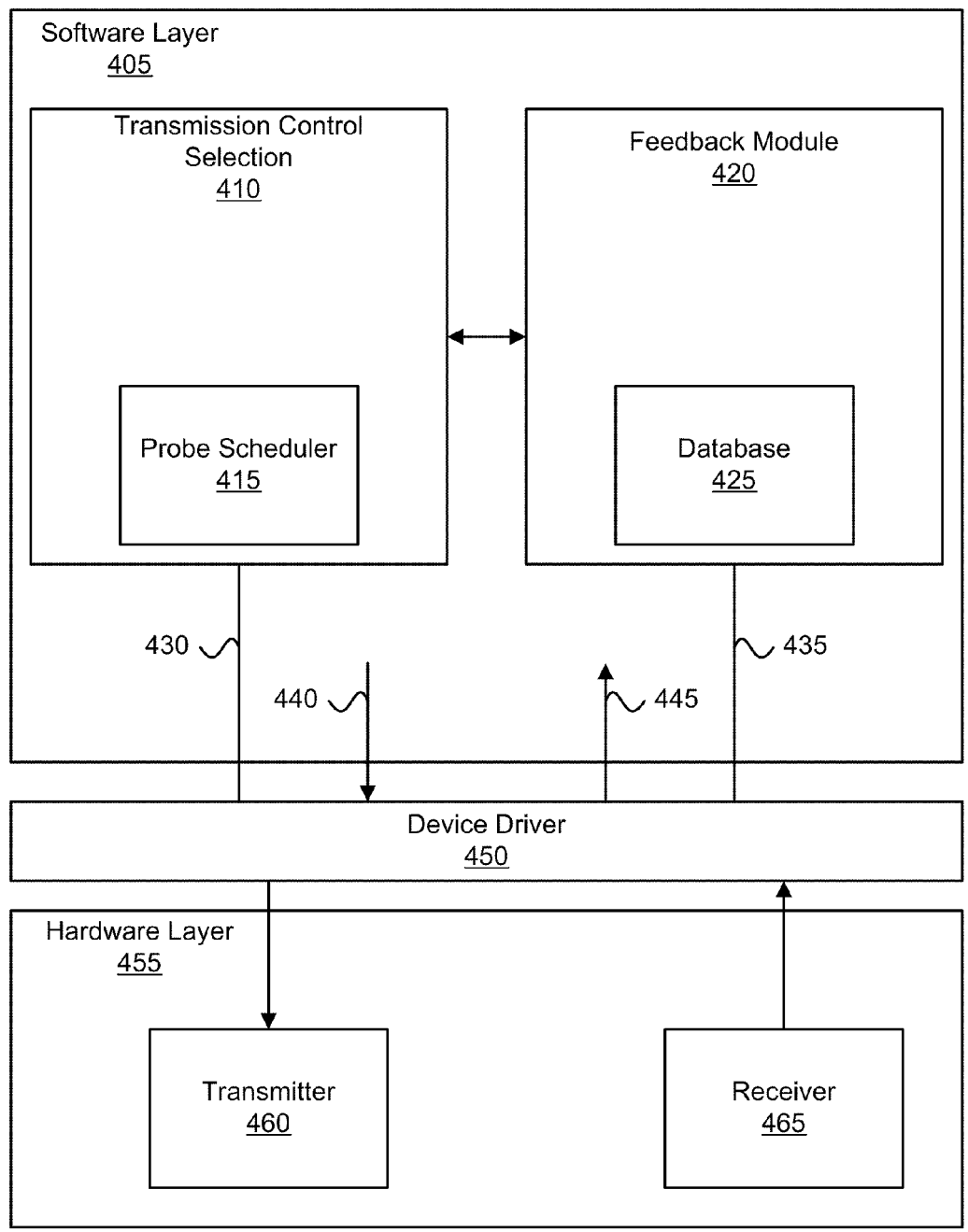
FIG. 4 illustrates a block diagram of an exemplary software layer, device driver, and a hardware layer of the system, in one embodiment in accordance with the present invention.

FIG. 4 illustrates a block diagram of an exemplary software layer 405, a device driver 450, and a hardware layer 455, in one embodiment in accordance with the present invention. The software layer 405 and the device driver 450 comprise instructions executed by the processor 320 (in FIG. 3). The hardware layer 455 comprises hardware elements of the system 100 described with respect to FIG. 3, such as the antenna selector device 310 and the communication device 120. Although describe as software and hardware elements, aspects of the invention may be implemented with any combination of software, hardware, and firmware elements.

The software layer 405 includes a transmission control selection 410 and a feedback module 420. The transmission control selection 410 includes a probe scheduler 415. The feedback module 420 includes a database 425. The hardware layer 455 includes a transmitter 460 and a receiver 465.

The transmission control selection 410 is linked to the feedback module 420. The transmission control selection 410 communicates with the device driver 450 via link 430. The feedback module communicates with the device driver 450 via link 435. The device driver 450 receives packets via link 440 from the software layer 405 and sends the packets to the transmitter 460 in the hardware layer 455. The device driver 450 also receives packets from the receiver 465 in the hardware layer 455 and sends the packets to the software layer 405 via link 445.

The transmission control selection 410 comprises software elements configured to select for the device driver 450 the current antenna configuration and the current physical data rate based on the feedback module 420 or based on the probe scheduler 415. The probe scheduler 415 comprises software elements configured to determine for the transmission control selection 410 an unused antenna configuration and an unused physical data rate based on predetermined criteria. One example of the predetermined criteria is determining an unused antenna configuration after the device driver 450 indicates as received 5 consecutive packets. The feedback module 420 comprises software elements configured to update link quality metrics for each antenna configuration and each physical data rate based on feedback from the device driver 450. The feedback module 420 is configured to maintain the link quality metrics in the database 425. The operation of the software layer 405, the device driver 450, and the hardware layer 455 are described below with respect to FIG. 6 and FIG. 7.

An advantage of the system 100 is that the transmission control selection 410 may select, for example, an antenna configuration for the antenna apparatus 110 that minimizes interference for communicating over the wireless link 140A to the remote receiving node 130A based on feedback (i.e., direct or indirect) from the receiving node. The device driver 450 indicates whether the remote receiving node received transmitted packets on a particular antenna configuration and physical data rate. Further, the transmission selection control 410 may select another antenna configuration for communicating over the wireless link 140B to the remote receiving node 130B based on the feedback, thereby changing the radiation pattern of the antenna apparatus 110 to minimize interference in the wireless link 140A and/or the wireless link 140B.

The transmission control selection 410 may select the appropriate antenna configuration corresponding to a maximum gain for the wireless links 140A-140C. Alternatively, the transmission control selection 410 may select the antenna configuration corresponding to less than maximal gain, but corresponding to reduced interference, in the wireless links 140A-140C. A further advantage is that transmission control selection 410 may select the physical data rate that provides the maximum effective user data rate at the remote receiving node 130A over the wireless link 140A.

Figure 5:
FIG. 5 illustrates an exemplary table of transmission control data showing a success ratio and a received signal strength indicator for multiple antenna configurations, in one embodiment in accordance with the present invention.

FIG. 5 illustrates an exemplary table 500 of transmission control data showing a success ratio 540 and a received signal strength indicator (RSSI) 550 for multiple antenna configurations 510, in one embodiment in accordance with the present invention. The rows of the table 500 correspond to the multiple antenna configurations 510 of the antenna apparatus 110. For example, a table of transmission control data for the antenna apparatus 110 having four selectable antenna elements {A, B, C, D}, would have fifteen possible antenna configurations 510 comprising the set {A|B|C|D|AB|AC|AD|BC|BD|CD|ABC|ABD|ACD|BCD|ABCD}, and 15 rows of table entries.

In a preferred embodiment, the table 500 is kept in the database 425 (FIG. 4) for each of the remote receiving nodes 130A-C. Each of the remote receiving nodes 130A-C may require different antenna configurations and/or physical data rates for optimal performance of each of the wireless links 140A-C, therefore multiple table 500s may be kept. For example, if five remote receiving nodes 130A-E were associated with the system 100, the processor 320 would maintain a separate table 500 for each of the five remote receiving nodes 130A-C. For ease of discussion, only a single table 500 will be discussed.

The table 500 stores, for each antenna configuration 510, a number of attempted transmissions 520 and a number of successful transmissions 530. The feedback module 420 (in FIG. 4) updates the number of attempted transmissions 520 for the current antenna configuration after the device driver 450 (in FIG. 4) indicates a packet as transmitted the remote receiving node. The feedback module 420 updates the number of successful transmissions 530 after the device driver 450 indicates the packet as received by the remote receiving node. In some embodiments, rather than updating the number of attempted transmissions 420 when the device driver transmits the packet, the feedback module 420 may update the number of attempted transmissions 520 after the device driver 450 indicates whether the remote receiving node received the packet.

The table 500 also stores a success ratio 540 and a RSSI 550. Although the success ratio 540 and the RSSI 550 are illustrated in the table 500, other link quality metrics may be stored in the table 500, such as voltage standing wave ratio (VSWR), signal quality, bit error rate, and error vector magnitude (EVM). The success ratio 540 comprises a computation of the number of successful transmissions 530 divided by the number of attempted transmissions 520. The success ratio 540 typically is updated by the feedback module 420 for each change in the number of attempted transmissions 520:

$$\text{Success Ratio } 540 = \frac{\text{Number of Attempted Transmissions } 520}{\text{Number of Successful Transmissions } 530}$$

The RSSI 550 comprises an indication of the strength of the incoming (received) signal in the receiver 465 (e.g., as measured on an 802.11 ACK packet received from the remote receiving node 130A in response to a packet transmitted to the remote receiving node 130A). The RSSI 550 may provide a better measurement than the success ratio 540 for differentiating between antenna configurations. The RSSI 550 may provide a better link quality metric for determining the current antenna configuration when each antenna configuration 510 has small values for the number of attempted transmissions 520 and the number of successful transmissions 530.

In one example, if two packets are sent to the remote receiving node 130A using two separate antenna configurations and are received, there may not be enough information based alone on the respective success ratios 540 to indicate whether one antenna configuration is more reliable. In other words, each of the two separate antenna configurations has a success ratio 540 of 100% (e.g., 2 attempted transmissions over 2 successful transmissions). However, the RSSI 550 may provide a more precise link quality metric. If one antenna configuration has the RSSI 550 value of 110 and the other antenna configuration has the RSSI 550 value of 115, for example, then the antenna configuration with the stronger RSSI 550 would potentially provide a more stable wireless link (e.g., over wireless link 140A).

Figure 6:
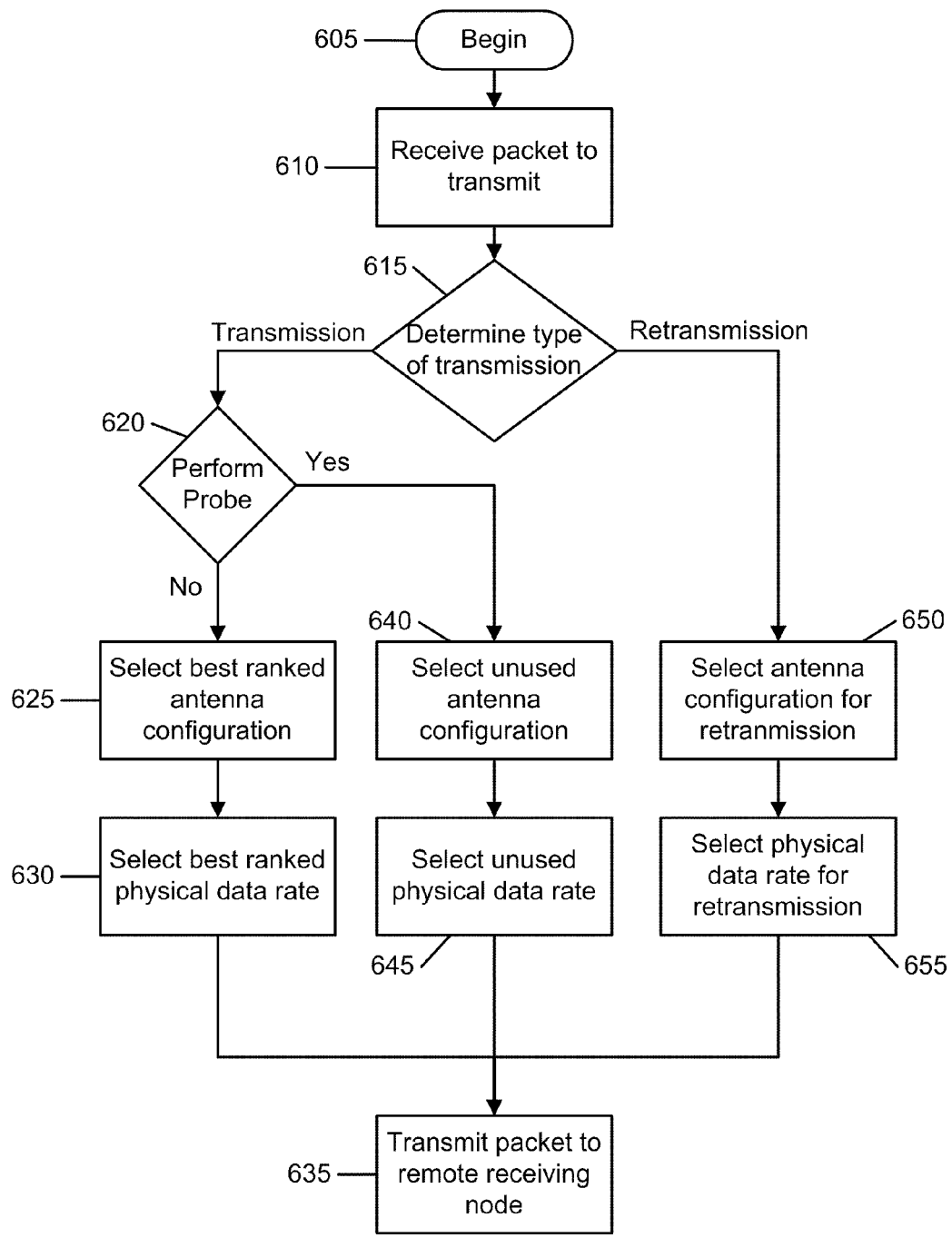
FIG. 6 shows a flowchart illustrating an exemplary method for transmission control selection, in one embodiment in accordance with the present invention.

FIG. 6 illustrates a flowchart of an exemplary method for transmission control selection with respect to FIGS. 3, 4, and 5, in one embodiment in accordance with the present invention. In step 605, the feedback module 420 initializes the database 425. For example, in the table 500, the feedback module 420 may initialize the number of attempted transmissions 520 and the number of successful transmissions 530 to zero. In some embodiments, the feedback module 420 may determine alternative initialization values for the table 500. For example, the feedback module 420 may determine initialization values for an antenna configuration that provides a substantially omnidirectional radiation pattern. The initialization values for the antenna configuration may be a high value for the success ratio 540 or the RSSI 550 to force the transmission control selection 410 to select the antenna configuration for the device driver 450.

In step 610, the device driver 450 receives a packet for transmission from the software layer 405. In step 615, device driver 450 determines the type of transmission. In general, the device driver 450 distinguishes between initial transmission of a packet and retransmission of the packet. Based on a determination to initially transmit the packet, the device driver 450 queries the transmission control selection 410 for the current antenna configuration and the current physical data rate.

In step 620, the transmission control selection 410 determines whether to perform a probe by referencing the probe scheduler 415. If the probe scheduler 415 determines not to perform a probe, in step 625, the transmission control selection 410 selects the current antenna configuration for the antenna apparatus 110 from the multiple antenna configurations in the table 500. For example, the transmission control selection 410 selects the best ranked antenna configuration having the highest success ratio 540. In an alternative embodiment, the transmission control selection 410 selects the antenna configuration having the highest RSSI 550.

In step 630, the transmission control selection 410 selects the current physical data rate from the multiple physical data rates provided by the communication device 120, as described further with respect to FIG. 8. The multiple physical data rates may be defined as in the IEEE 802.11 specification for wireless networks, including, for example, the physical data rates of 1 Mbps, 2 Mbps, 5.5 Mbps, and 11 Mbps for IEEE 802.11b. In step 635, the device driver 450 sends the packet to the transmitter 460 of the hardware layer 455. The transmitter 460 transmits the packet on the current antenna configuration at the current physical data rate over the wireless link 140 to a particular remote receiving node (e.g., the remote receiving node 130A).

Referring again to step 615, retransmission of the packet is a high priority if the packet is not indicated as received by the remote receiving node 130A. The need for retransmission may indicate problems in the wireless link 140A. When the packet is to be retransmitted, the transmission control selection 410 attempts to determine the antenna configuration for retransmission and the physical data rate for retransmission that is most likely to be successful. In step 650, the transmission control selection 410 selects an antenna configuration for retransmission. In some embodiments, the transmission control selection 410 selects the next lower ranked antenna configuration in the table 500. In step 655, the transmission control selection 410 selects a physical data rate for retransmission. The transmitter 460 then transmits the packet in step 635 as described herein.

In some embodiments, in step 650, the transmission control selection 410 selects the same current antenna configuration, but, in step 655, the transmission control selection 410 incrementally lowers the physical data rate at which the packet is retransmitted to the remote receiving node 130A. The lower physical data rate should give the remote receiving node 130A more time to obtain a successful reception of the packet.

In other embodiments, for each retransmission, in step 650, the transmission control selection 410 alternates between selecting the next antenna configuration based on the success ratio 540 and the RSSI 550. For example, on the first retransmission, the transmission control selection 410 selects the next lower ranked antenna configuration based on the success ratio 540. If the device driver 450 determines that the remote receiving node 130A did not indicate reception of the packet, the device driver 450 will retransmit the packet, and the transmission control selection 410 will select the next lower ranked antenna configuration based on the RSSI 550. For each subsequent retransmission to the remote receiving node 130A, the transmission control selection 410 alternates between selecting antenna configurations based on the success ratio 540 and the RSSI 550.

Referring back to step 620, when a number of consecutive packets are successfully transmitted to and indicated as received by the remote receiving node 130A, indicating stability in the wireless link 140A, the transmission control selection 410 may determine to perform a probe of unused antenna configurations. Probing is the temporary changing of the current antenna configuration to one of the unused antenna configurations for transmission of a packet. The unused antenna configuration is any antenna configuration that is not the current antenna configuration. Probing allows the feedback module 420 to update the values of the table 500 for the unused antenna configurations. Probing consciously and temporarily changes the current antenna configuration to ensure that the database 425 is not stale. Additionally, probing allows the system 100 to anticipate changes in the wireless link 140A.

Based on a positive determination to perform a probe by referencing the probe scheduler 415, the transmission control selection 410 in step 640 selects an unused antenna configuration. Transmitting on the unused antenna configuration may result in a higher ranked success ratio 540 than the current antenna configuration. Additionally, in step 645, the transmission control selection 410 also may probe an unused physical data rate as discussed further below. In step 635, the transmitter 460 transmits the probe packet to the remote receiving node 130A.

Figure 7:
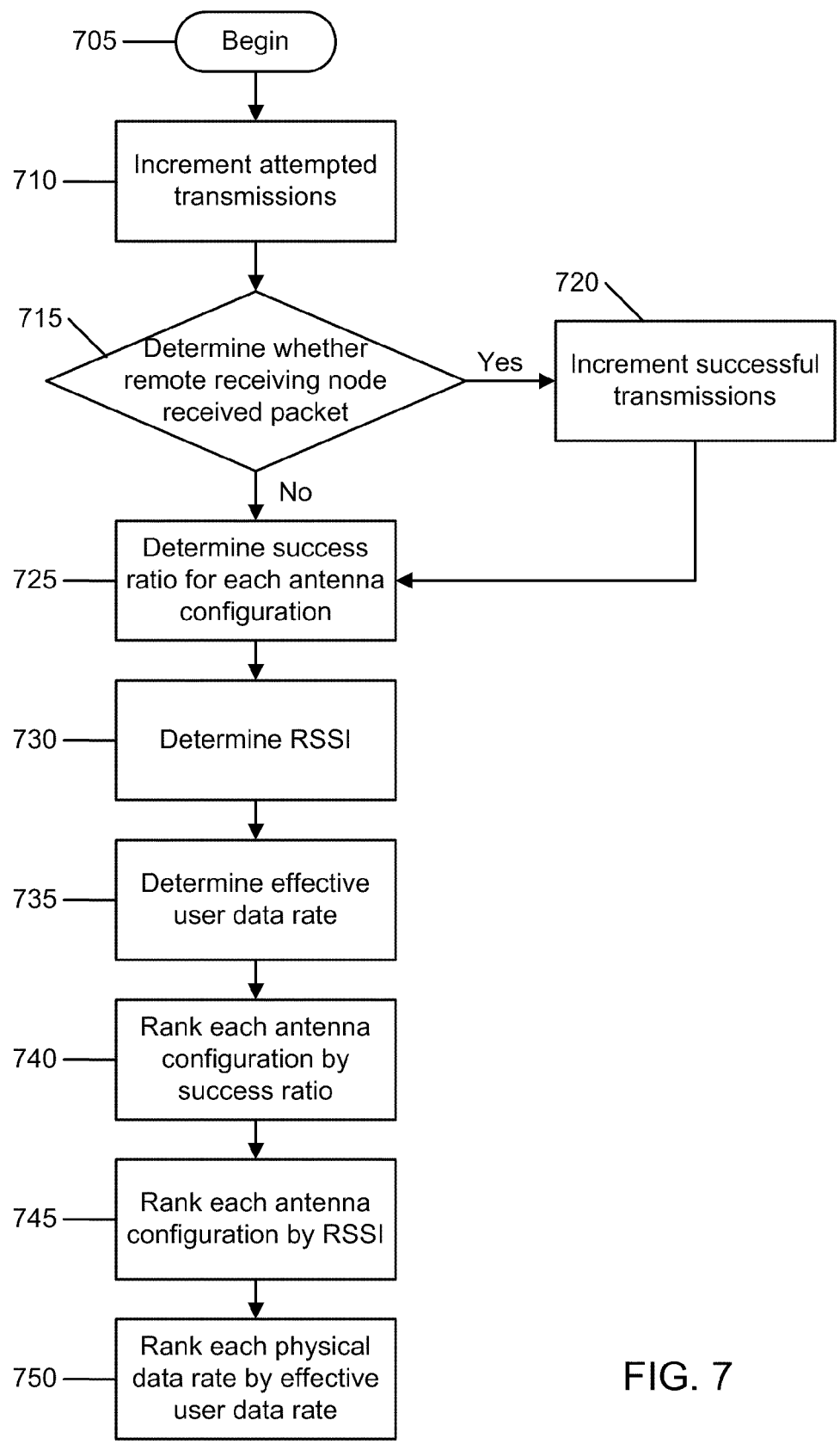
FIG. 7 shows a flowchart illustrating an exemplary method for feedback processing, in one embodiment in accordance with the present invention.

FIG. 7 illustrates a flowchart of an exemplary method for feedback processing with respect to FIGS. 3, 4, and 5, in one embodiment in accordance with the present invention. In this example, the method begins in step 705 after transmission of the packet, as described with respect to FIG. 6. In step 710, the feedback module 420 increments the number of attempted transmissions 520 for the current antenna configuration.

In step 715, the device driver 450 determines whether the remote receiving node 130A indicated reception of the transmitted packet as discussed in regard to FIG. 6. If the remote receiving node 130A indicated reception of the packet, in step 720, the feedback module 420 increments the number of successful transmissions 530 for the current antenna configuration. In step 725, in some embodiments, whether the remote receiving node 130A indicated reception of the packet or not, the feedback module 420 computes the success ratio 540 for each antenna configuration 510.

As previously discussed with respect to FIG. 5, the feedback module 420 determines a variety of link quality metrics which allow the transmission control selection 410 to select an antenna configuration. For example, in step 730, the feedback module 420 may determine the RSSI 550 for each antenna configuration 510 for the remote receiving node 130A. In step 735, the feedback module 420 may determine the effective user data rate for each physical data rate of each antenna configuration 510.

In step 740, the feedback module 420 ranks each of the antenna configurations 510 by the success ratio 540. In step 745, the feedback module 420 may also rank the antenna configurations 510 by the RSSI 550. As described further with respect to FIG. 8, in step 750, the feedback module 420 may rank each physical data rate of each antenna configuration 510 for the remote receiving node 130A by the effective user data rate. This enables the transmission control selection 410 to select a physical data rate that may have a higher effective user data rate than the current physical data rate.

Advantageously, the software layer 405 determines link quality metrics, such as the success ratio 540 and the RSSI 550, such that for each packet, an antenna configuration is selected having a high success ratio 540 to transmit to the remote receiving nodes 130A-130C via the wireless links 140A-140C. This provides greater throughput because the software layer 405 may select from those antenna configurations having high success ratios. Additionally, the software layer 405 minimized packet loss because the feedback module 420 constantly processes link quality metrics to determine the stability of the wireless links 140A-C to the remote receiving nodes 130A-C.

In some alternative embodiments, with respect to retransmission as described with respect to FIG. 6, if the device driver 450 determines that the remote receiving node 130A did not indicate reception of the transmitted packet, the transmission control selection 410 may execute an alternative method to select the new antenna configuration to facilitate retransmission of the packet over the wireless link 140A to the remote receiving node 130A. For example, the transmission control selection 410 may select the new antenna configuration as the next lower ranked antenna configuration in the table 500. The transmission control selection 410 may, for each subsequent retransmission of the packet, select the new antenna configuration as a next lower ranked antenna configuration.

In this manner, the transmission control selection 410 may select a new antenna configuration by "walking down" the ranked table 500 until an antenna configuration successfully transmits the packet. However, because the wireless link 140 may change dramatically at any time, walking down the table 500 may not rapidly find a new good antenna configuration. Accordingly, in one embodiment, the transmission control selection 410 may select up to three next lower ranked antenna configurations on which to retransmit. If none of these relatively highly ranked antenna configurations is successful, then the wireless link 140A may have changed, and the transmission control selection 410 may randomly select the new antenna configuration from among any of the remaining available antenna configurations. In this manner, the transmission control selection 410 does not waste time searching sequentially through the table 500 for a good antenna configuration.

In some embodiments, the feedback module 420 may further optimize selecting the new antenna configuration. In these embodiments, the table 500 in the database 425 may be "aged." For example, if successful transmission for a number of packets is disrupted on the current antenna configuration because of interference, the transmission control selection 410 may not rapidly change the current antenna configuration in response to the interference. An increase in the number of unsuccessful transmissions will only slightly decrease the success ratio 540 for the current antenna configuration.

For example, if the wireless link 140A has been successful for 80 out of 100 packet transmissions, the wireless link 140A will have an 80% success ratio 540. If the wireless link 140A encounters 5 consecutive unsuccessful packet transmissions, the success ratio 540 drops to approximately 76%. However, by having the feedback module 420 age the table 500 by a predetermined value, such as 2, the transmission control selection 410 will be more sensitive to change in the wireless link 140A, thereby improving the speed of selecting the new antenna configuration.

Referring again to the example, after aging the table 500, the current antenna configuration would have 40 successful transmissions out of 50 attempted transmissions, again having a success ratio 540 of 80%. If the wireless link 140A again encounters 5 consecutive unsuccessful packet transmissions, the success ratio drops to approximately 72%. In this manner, by aging of the table 500 by the feedback module 420, a smaller number of unsuccessful transmissions may have a greater impact on the success ratio of the current antenna configuration, thereby allowing the transmission control selection 410 to more rapidly determine a better new antenna configuration.

In another embodiment, the transmission control selection 410 may select the new antenna configuration from antenna configurations "historically" known to have a higher success ratio 540. For example, over a period of time the feedback module 420 may rank one or more antenna configurations as having a consistently higher success ratio 540. The transmission control selection 410 may select the new antenna configuration from among the historically good antenna configurations.

In yet another embodiment, the feedback module 420 may incorporate a threshold value in the ranking of the antenna configurations 510. The threshold value sets a limit above which the success ratio 540 of an antenna configuration must reach before the antenna configuration is ranked higher and/or lower than the current antenna configuration. For example, a threshold value set to 3% prevents the transmission control selection 410 from selecting a new antenna configuration having a success ratio 540 only 1% higher than the success ratio 540 of the current antenna configuration.

Thus, the incorporation of the threshold value provides stability to the wireless links 140A-C because the transmission control selection 405 will not change to the new antenna configuration unless the new antenna configuration has a sufficiently higher success ratio 540 than the current antenna configuration. Providing the threshold value limits the overhead associated with selecting from all of the antenna configurations 510, while still allowing new antenna configurations with sufficiently higher success ratios 540 to be selected.

FIG. 8 illustrates an exemplary table 800 of effective user data rates 820 for multiple physical data rates 810, in one embodiment in accordance with the present invention. The feedback module 420 (i.e., executed by the processor 320) maintains the table 800 in the database 425 for each allowable antenna configuration 510 of the antenna apparatus 110 and for each remote receiving node 130A-C. However, for clarity, the method will describe the table 800 for only the current antenna configuration.

The table 800 includes a computation of the effective user data rate 820 for each allowable physical data rate 810. In one embodiment, the effective user data rate 820 for a particular physical data rate is computed as the product of the success ratio 540 (FIG. 5) associated with the current antenna configuration and the transactional throughput of the physical data rate. For example, the effective user data rate 820 for the physical data rate of 54 Mbps for an antenna configuration having the success ratio 540 of 80% is computed as follows:

success ratio 540=80% physical data rate=54 Mbps protocol overhead=26.7 Mbps effective user data rate 820=80%*(54 Mpbs−26.7 Mbps)=21.84 Mbps.

The feedback module 420 computes and tracks the effective user data rate 820 for each allowable physical data rate 810 because a higher physical data rate does not necessarily lead to a higher data throughput over the wireless links 140A-C. For example, switching to a lower physical data rate for an antenna configuration with a relatively high success ratio 540 may provide higher overall data throughput than switching to a higher physical data rate for an antenna configuration having a relatively lower success ratio 540. In this way, the transmission control selection 410 may change the current physical data rate to the new physical data rate which provides the higher effective user data rate 820 over the wireless links 140A-C.

Similar to the method of probing described with respect to FIG. 6 for probing unused antenna configurations, the probe scheduler 415 (FIG. 4) may determine to probe one or more unused physical data rates to select the new physical data rate. By probing, the feedback module 420 may update the table 800 for the unused physical data rates. The feedback module 420 then determines the effective user data rate 820 for the unused physical data rate and ranks the table 800 by the effective user data rate 820. Thereafter, the transmission control selection 410 may select the new physical data rate having the higher effective user data rate 820. Therefore, the feedback module 420 prevents the table 800 data from becoming stale and facilitates selection of the appropriate new physical data rate.

To further optimize selecting the new physical data rate, in some embodiments, the feedback module 420 ages the table 800 in the database 425 in a manner similar to the description herein with respect to the aging of table 500. Thus, the transmission control selection 410 may more rapidly determine the new physical data rate. In another embodiment, the transmission control selection 410 may select the new physical data rate from the physical data rates 810 "historically" known to have a higher effective user data rate 820. Thus, the feedback module 420 may track the physical data rate having the consistently higher effective user data rate 820. The transmission control selection 410 selects the new physical data rate from among the historically higher physical data rates.

In yet another embodiment, the feedback module 420 may execute a method for incorporating a threshold value for selecting the new physical data rate. The threshold value sets a limit above which the effective user data rate 820 of a physical data rate must reach before that physical data rate is selected as the new physical data rate. Thus, the incorporation of the threshold value allows the software layer 405 to maximize data throughput, while still allowing physical data rates with sufficiently higher effective user data rates 820 to be selected as the new physical data rate.

In some embodiments, rather than the feedback module 420 maintaining the entire table 500 and the entire table 800 in the database 425, the feedback module 420 may track the success ratio 540 for a limited number of antenna configurations and the effective user data rate 820 for a limited number of physical data rates 810. By tracking the limited number of antenna configurations and the limited number of physical data rates 810, the feedback module 420 requires less memory and processing time to maintain and determine the respective success ratio 540 and the effective user data rate 820.

To track the limited number of antenna configurations, the feedback module 420 maps the allowable antenna configurations into logical antennas and defines a relationship between each logical antenna and at least one other logical antenna. The feedback module 420 also maps the allowable physical data rates 810 into logical data rates and defines a relationship between each logical data rate and at least one other logical data rate.

For the purposes of illustration, one exemplary mapping defines the current logical antenna as having an upper logical antenna and a lower logical antenna. For example, referring again to FIG. 2, if the current logical antenna corresponds to the antenna configuration having the radiation pattern 215, the upper logical antenna may be the antenna configuration having radiation pattern 205. The lower logical antenna may be the antenna configuration having the combined radiation pattern 210. Note that the current logical antenna, the upper logical antenna, and the lower logical antenna may be any of the antenna configurations, and need not be "neighboring" antenna configurations as depicted in FIG. 2.

Similarly, the exemplary mapping for the current logical data rate defines the current logical antenna as having an upper logical data rate and a lower logical data rate. For example, for 802.11a, the current logical data rate corresponding to the physical data rate of 36 Mbps has an upper logical data rate corresponding to the physical data rate of 48 Mbps and a lower logical data rate corresponding to the physical data rate of 24 Mbps.

Therefore, by defining current, upper, and lower mappings, the feedback module 420 tracks three values for the success ratio 540 and three values for the effective user data rate 820. The feedback module 420 is able to rapidly rank from the mappings a new logical antenna or logical data rate which may be used for transmission via the wireless links 140A-C. It will be understood by the skilled artisan that various alternative mappings may be implemented and tracked by the feedback module 420 without departing from the spirit of the invention as described herein (for example, an upper upper logical antenna and a lower lower logical antenna).

In operation, the transmission control selection 410 may select, for transmission of a packet by the device driver 450, the upper logical antenna or the lower logical antenna that has a higher success ratio 540 than the current logical antenna. To determine whether the upper logical antenna or the lower logical antenna has a higher success ratio 540, the transmission control selection 410 periodically probes, or transmits packets on, the upper logical antenna and the lower logical antenna allowing the feedback module 420 to update the database 425. Then, if transmission control selection 410 determines to change the current logical antenna, the feedback module 420 determines whether the upper logical antenna or the lower logical antenna provides the higher success ratio 540 and the transmission control selection 410 selects that logical antenna as the new logical antenna.

Similarly, the feedback module 420 executes a method for optimizing the physical data rate. By determining the effective user data rate 820 for the upper logical data rate or the lower logical data rate, the transmission control selection 410 may change the current logical data rate to the new logical data rate that provides the higher effective user data rate 820 over the wireless links 140A-C. The transmission control selection 410 may probe the upper logical data rate and the lower logical data rate to allow the feedback module 420 to update the database 425 and determine which logical data rate provides the higher effective user data rate 820.

The transmission control selection 410 may further execute other optimizations for the selection of the new logical antenna or the new logical data rate. In one embodiment, the transmission control selection 410 alternately transmits a packet on the upper logical antenna and the lower logical antenna for each transmission on the current logical antenna. This provides the advantage of quickly converging to the new logical antenna having the higher success ratio 540, because a probe is sent alternatively on the upper logical antenna and the lower logical antenna in an effort to determine if either the upper logical antenna or the lower logical antenna has a higher success ratio 540 than the current logical antenna. Similarly, the transmission control selection 410 may rapidly converge on the new logical data rate having the higher effective user data rate 820 by transmitting a packet at the upper logical data rate and the lower logical data rate. In some embodiments, the transmission control selection 410 may periodically probe on the upper and lower logical antennas and/or the upper and lower logical data rates. For example, the transmission control selection 410 may probe once on the upper and lower logical antennas for every 5 packets sent on the current logical antenna.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention. It will be recognized that the terms "comprising," "including," and "having," as used herein, are specifically intended to be read as open-ended terms of art.

What is claimed is:

1. A system for wireless communication, comprising:
    a plurality of antenna elements including one or more selectable horizontally polarized antennas and one or more selectable vertically polarized antennas that transmit or receive a radio frequency (RF) signal with a remote node through a wireless link;
    an antenna element selecting device that selects a first combination of one or more of the plurality of antenna elements to transmit or receive an RF signal; and
    interference detection circuitry that detects interference in the wireless link, the antenna element selecting device further selecting a second combination of one or more of the plurality of antenna elements to transmit or receive an RF signal when the interference detection circuitry detects wireless link interference.

2. The system of claim 1, wherein the interference detecting circuitry includes a processor that executes code that detects feedback in a signal received from the remote node and to select an antenna configuration in response to the feedback.

3. The system of claim 1, wherein the interference detecting circuitry selects a physical data rate at which to transmit an RF signal.

4. The system of claim 1, wherein the physical data rate is approximately 2.4 gigahertz.

5. The system of claim 1, wherein the physical data rate is approximately 5.0 gigahertz.

* * * * *